May 14, 1940. C. F. MEGOW 2,200,798
MOTOR VEHICLE
Filed June 13, 1938 3 Sheets-Sheet 1
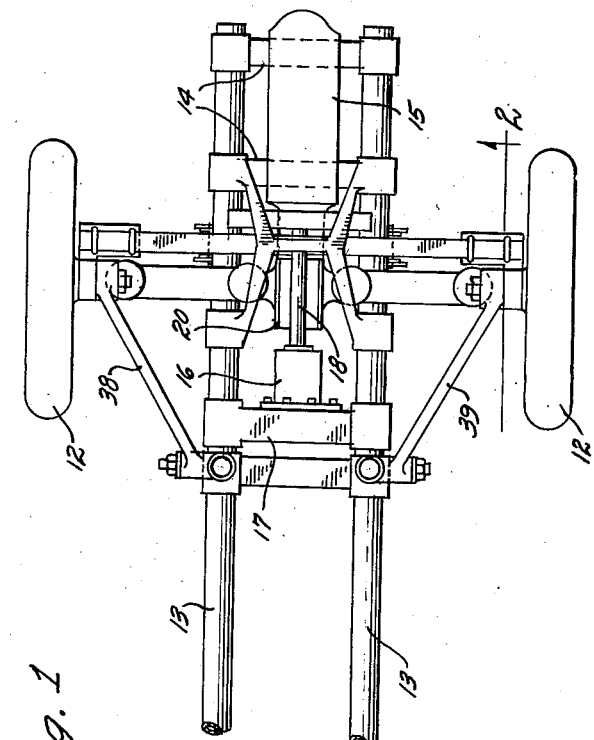
Fig. 1
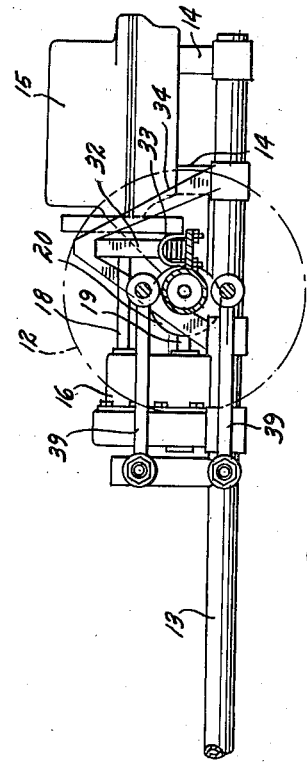
Fig. 2
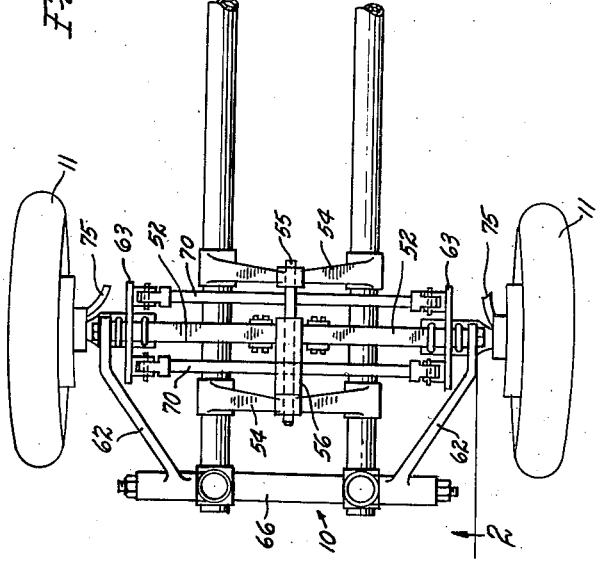
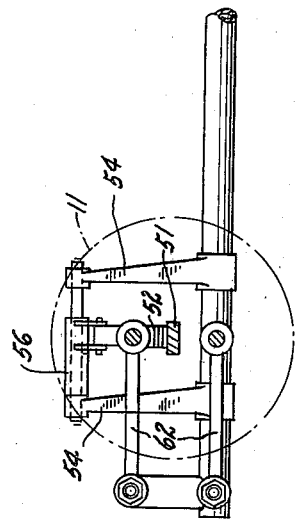
Inventor
CHARLES F. MEGOW.
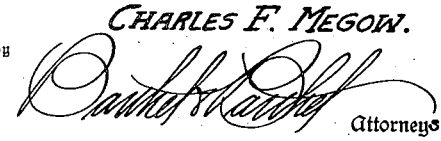
By
Attorneys May 14, 1940.　　　　C. F. MEGOW　　　　2,200,798
MOTOR VEHICLE
Filed June 13, 1938　　　　3 Sheets-Sheet 2

Inventor
CHARLES F. MEGOW.
By
Attorneys

May 14, 1940.　　　C. F. MEGOW　　　2,200,798
MOTOR VEHICLE
Filed June 13, 1938　　　3 Sheets-Sheet 3

Inventor
CHARLES F. MEGOW.
By
Attorneys

Patented May 14, 1940

2,200,798

UNITED STATES PATENT OFFICE 2,200,798

MOTOR VEHICLE

Charles F. Megow, Detroit, Mich.

Application June 13, 1938, Serial No. 213,388

8 Claims. (Cl. 280—124)

This invention relates generally to motor vehicles and more particularly to chassis therefor.

One of the objects of the present invention is to provide a new and improved motor vehicle chassis having independent suspension of the vehicle wheels.

Another object of the present invention is to provide a new and improved motor vehicle chassis having a controllable or shiftable center of gravity so that on rounding a curve the vehicle body will incline inward of the curve.

Another object of the invention is to provide a chassis in which the frame and associated structure is spring suspended on transverse springs in a new and improved manner.

Another object of the invention is to provide a chassis of the above mentioned character which provides improved vehicle riding qualities, is light in weight yet strong and inexpensive to manufacture.

Other objects of the invention will be apparent from the following description taken in connection with the accompanying drawings which form a part of the specification and in which:

Figure 1 is a top plan view of my improved motor vehicle chassis;

Fig. 2 is a side view of the chassis showing parts in section and taken along the line 2—2 of Fig. 1;

Figure 4:
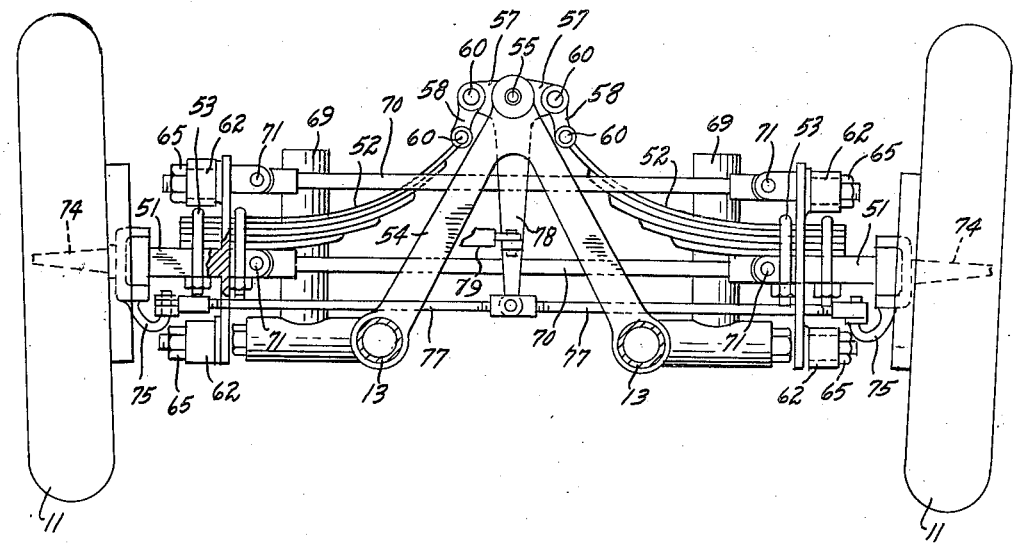
Fig. 4 is an end view of the front end of the chassis, taken along the line 4—4 of Fig. 3.
Figure 3:
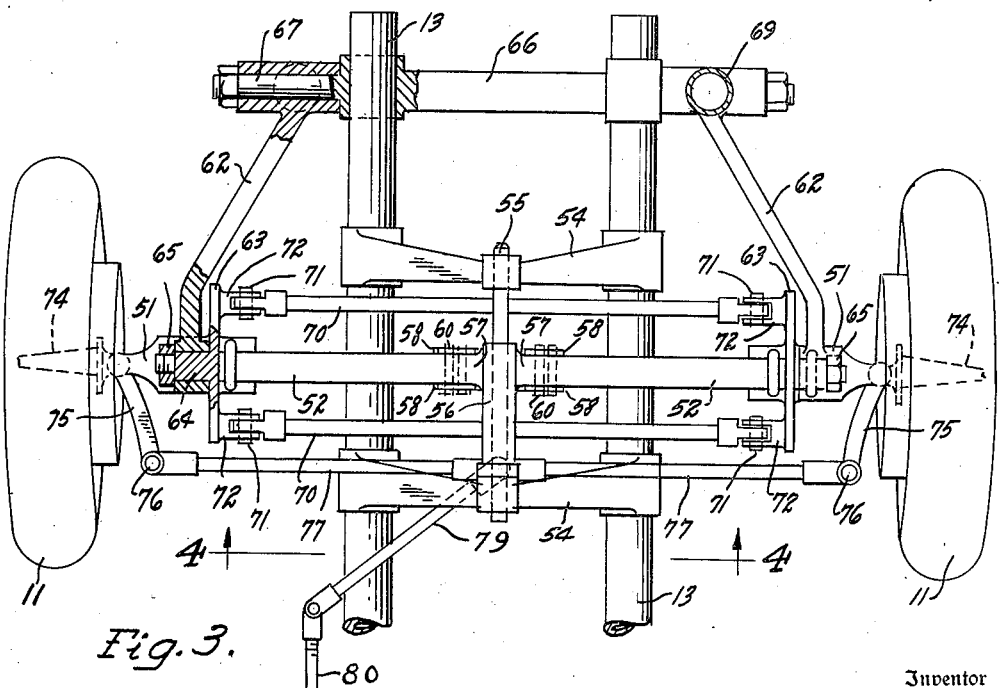
Fig. 3 is an enlarged plan view of a front end portion of the vehicle chassis.

Referring to the drawings by characters of reference, the chassis includes a frame 10 mounted on front and rear wheels 11 and 12 respectively, the frame 10 being underslung, or suspended beneath the wheel axles. The frame 10 includes a pair of spaced apart, preferably parallel, longitudinal frame members 13 which are tubular in form for strength and rigidity and are rigidly secured together in part by a pair of spaced apart transverse frame members 14 on which an engine 15 is rigidly mounted, the engine 15 being located adjacent the rear of the vehicle, in the present instance. Forward of the engine 15, a transmission 16 is rigidly mounted on a frame cross member 17 and is driven from the engine drive shaft 18 beneath which a propeller shaft 19 of the transmission drives the rear wheels 12 through the usual differential gears, enclosed in a housing 20 which is disposed between the engine and the transmission and may be integral with the engine block.

The rear drive shaft is of sectional construction and each side of the differential housing is an intermediate shaft section 22 connected at one end thereof by a universal joint 23 to the outer end of a shaft 24 of the differential 20 and is connected at its other end by a universal joint 25 to one end of an outer shaft section 26, the outer shaft section having a spindle 27 on which the rear wheels 12 are rotatably mounted. It will be seen that the articulated rear axle drive shaft having universal joints permits vertical relative movement between the rear wheels 12 and the differential 20. The rear axle is preferably enclosed by a housing 28 which may comprise a number of sections secured together and to the differential casing 20 and in the housing adjacent its outer ends, bearings 29 may be provided to receive the outer shaft sections 26 which hold the rear wheels against side movement. Brackets 30 are mounted on and rigidly secured to the housing 28, one adjacent each of the wheels 12, and each of the brackets 30 has an extended portion 31 to support the outer lower large or butt ends of a pair of leaf springs 32 which extend transverse of the frame 10 and may be rigidly secured to the brackets 30 by U-bolts 33. Rigidly secured to the longitudinal frame members 13, a support 34 is provided with a transversely extending portion 34a spaced above the frame and to which the upper or smaller ends of the springs 32 are attached preferably by spring shackles 35 which are pivoted, as at 36, to the support 34, the upper ends of the springs having eyes to receive pins 36 which pivotally connect the upper ends of the springs to the lower ends of the pivoted shackles 35. From the above, it will be seen that the frame 10, engine 15, integral differential transmission 16 and other units and parts mounted on the frame are all suspended from the rear axle by the two rear transverse springs 32.

Figure 5:
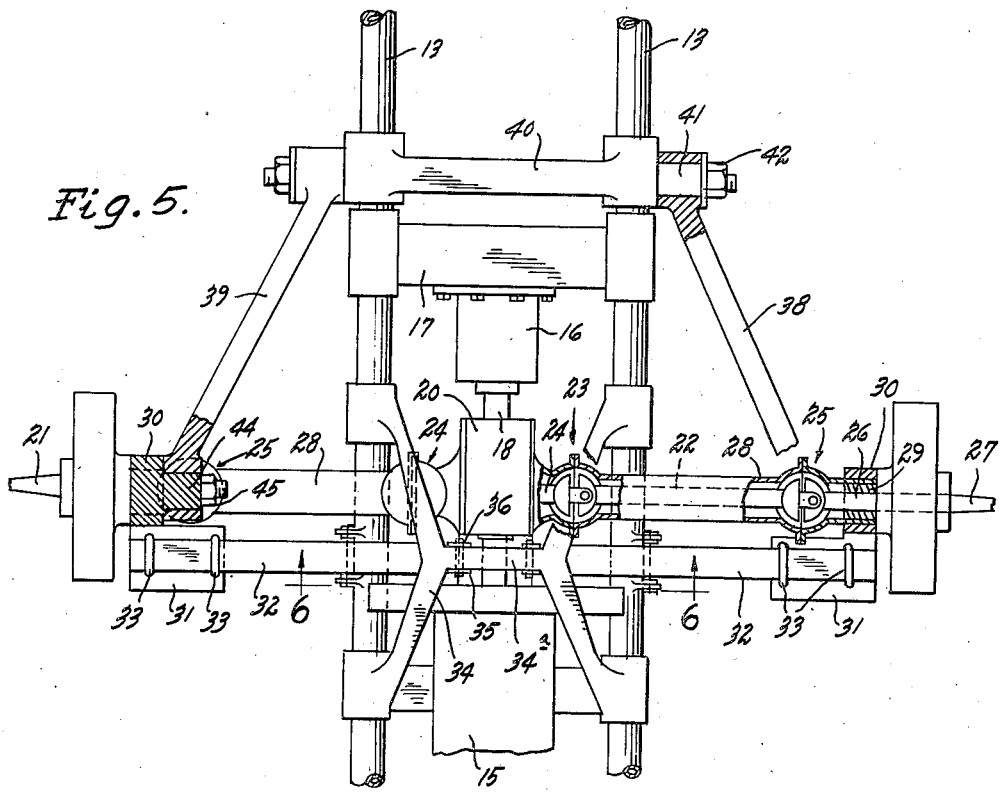
Fig. 5 is an enlarged plan view of a rear end portion of the vehicle chassis having parts broken away and in section.

In order to prevent movement of the rear axle structure relative to the frame in horizontal planes about the universal joints so that the rear wheels 12 will be held parallel to the longitudinal frame members 13, I provide a pair of vertically spaced bars or rods 38 connecting the rear axle housing adjacent one rear wheel to the frame and a second pair of vertically spaced parallel rods 39 connecting the axle housing adjacent the other wheel to the frame, these pairs of parallel bars being angularly disposed as shown in Figs. 1 and 5. Forward of the frame cross member 17 is provided a second frame cross member 40 which rigidly secures the longitudinal frame members 13 together and is provided with oppositely directed stub shafts or pins 41 extending outwardly and laterally of the longitudinal frame member 13, the lower bars 38 and 39 of each pair of parallel bars being pivoted at their forward ends on the stub shafts and may be held against lateral movement by nuts 42 which may screw-thread on reduced outer end portions of the stub shafts or pins 41. A pair of vertical substantially parallel tubular members may be welded or otherwise rigidly secured at their lower ends to the longitudinal frame member 13, and above and preferably in vertical alignment with the lower pivot pins 41 the vertical tubular members are provided with similar laterally extending pivot pins on which the forward ends of the upper parallel bars are pivoted and prevented from lateral movement by nuts 42. At their rear ends the parallel bars are pivoted to inwardly directed stub shafts or pins 44 with nuts 45 provided on vertical plate-like supports 46 integral with the supporting member 30 which are mounted on and rigidly secured to the rear axle housing adjacent the outer ends thereof. The parallel bars 39 and 40 being pivoted at their opposite ends as above described permit individual vertical up and down movement of the rear wheels 12 but hold the rear wheels parallel to the vehicle frame.

Figure 6:
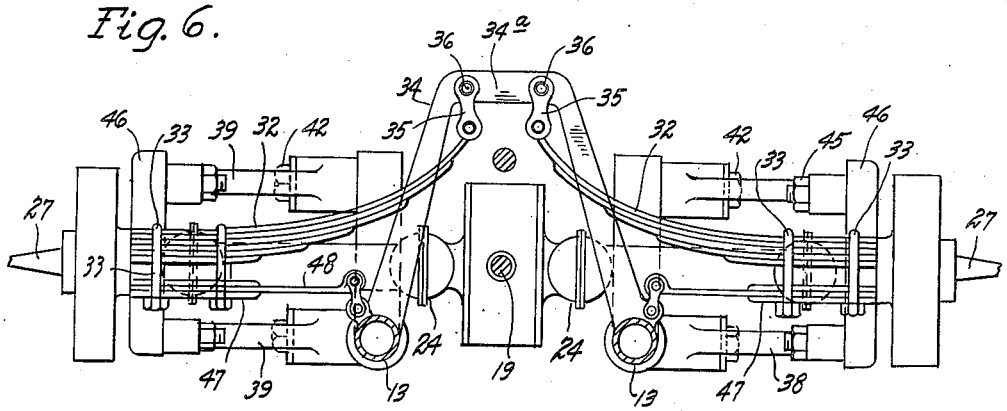
Fig. 6 is an end view of the rear end of the chassis, taken along the line 6—6 of Fig. 5.

In order to eliminate the need of expensive shock absorbers for motor vehicles, I provide shock absorbers 47 each comprising a plurality of spring strips which may be secured together and to the spring supports 31 by the spring bolts 33, as shown in Fig. 6. In the present instance, the leaf spring shock absorbers 47 each comprises three superimposed metallic spring strips of which the center strip, as at 48, is longer than the other two and on its inner end may be provided with an eye to receive a shackle bolt which pivotally connects the inner end of the shock absorber to the upper ends of a pair of shackle arms which have their lower ends pivoted to the support 34 which is rigidly mounted on the frame. It will be seen that the spring shock absorbers 47 will yieldably resist with equal force, vertical movement of the frame in opposite directions in absorbing shocks and that such shock absorbers are very inexpensive to manufacture.

Referring now to the front end construction of my motor vehicle chassis, the front wheels 11 are mounted individually on stub shafts 51 on which the outer large ends of a pair of transverse leaf springs 52 are respectively supported and secured thereto by U-bolts 53. Mounted on and rigidly secured to the longitudinal frame members 13 is a pair of spaced V-shaped upwardly extending supporting members 54 which adjacent their upper ends are provided with aligning apertures to receive and support a shaft 55 extending centrally and longitudinally of the frame members 13, and rotatably supported on the shaft 55, a sleeve 56 is provided with oppositely directed arms 57 to which the inner and upper small ends of the transverse leaf springs 52 are respectively pivotally supported by shackles 58 pivoted at their upper ends to the arms 57 and at their lower ends to the springs 52 by shackle pins 60. Like the rear axle structure, the front wheel axles 51 are held against horizontal movement about their longitudinal axes by a pair of vertically spaced, parallel bars 62 positioned on each side of the frame and pivotally connecting the axles 51 to the frame, the parallel bars extending longitudinally of and at angles to the longitudinal frame members 13. Each of the wheel axles 51 is provided with an integral, vertical support or plate 63, each having a pair of outwardly directed pins 64 on which the rear ends of the parallel bars 62 are pivotally supported and held against lateral movement by nuts 65 screwthreaded on to the outer ends of the pins 64. Forward of the front axles, a frame cross member 66 rigidly secures the longitudinal frame members 13 together and has oppositely directed pins or stub shafts 67 on which the lower bars of each pair are pivotally supported and held against lateral movement by nuts threaded on to the outer ends of the shaft 67. Similarly the upper bars 62 of each pair are pivotally supported on pins or stub shafts which project outward from vertical tubular members 69 which may be welded or otherwise rigidly secured at their lower ends to the longitudinal frame members 13.

The front axles 51 are pivotally connected together for individual vertical movement by two pair of parallel bars 70 which extend transversely of the vehicle frame having their opposite ends pivoted on longitudinal pins 71 supported in inwardly directed bosses 72 on the axle plates 63. The front wheels are rotatably mounted on spindles 74 which are pivoted at their inner ends to the stub axles 51 and are provided with steering arms 75. The steering arms 75 are pivotally connected, as at 76, to the outer ends of transversely extended rods 77 which are pivotally connected at their inner ends to the lower end of an arm 78, Fig. 4, which depends from and is integral with the sleeve 56, mounted on the shaft 55. Also pivotally connected to the depending arm 78 is one end of a rod 79, the other end of which is connected to a rod 80 which may be connected to any suitable type of steering mechanism.

In operation of the vehicle, if any one of the individually vertically movable wheels should encounter a recess in a road it will be seen that the shock will be taken substantially entirely by the wheel and little of the shock will be transmitted to the frame since the frame and parts mounted thereon are suspended from the upper small ends of the front and rear pairs of leaf springs. On turning a curve, arm 78 will be pivoted, by operation of the steering gear, in a direction such that downward pressure is put on one of the leaf springs 52 and upward pressure is brought to bear on the opposite spring 52 whereby the frame is tilted inward of the arc or curve around which the vehicle is traveling. By providing for tilting the frame inward of a curve taken by the vehicle it will be appreciated that the effect of centrifugal force on persons in the vehicle is lessened which gives greater riding comfort.

From the foregoing description it will now be seen that I have provided a new and improved motor vehicle chassis having novel individual wheel suspension and improved suspension of the frame and associated parts. It will further be seen that I have provided a motor vehicle chassis so constructed as to improve riding qualities of vehicles and that my improved chassis is comparatively inexpensive to manufacture.

What I claim is:

1. In a motor vehicle, a frame, individual axles for opposite wheels of the vehicle, a pair of transverse individual leaf springs secured to said axles and supporting said frame, parallel arms individually connecting said axles to said frame, said parallel arms extending longitudinally of the vehicle and pivoted to said frame and to said axles, and transverse substantially parallel arms pivotally connecting the individual axles together.

2. In a motor vehicle, a frame, individual axles for opposite wheels of the vehicle, a pair of transverse leaf springs mounted on said axles and supporting said frame, substantially parallel arms individually connecting said axles to said frame, said arms extending longitudinally of said frame and respectively pivoted to said frame and to said axles, and pairs of upper and lower transverse connecting bars on opposite sides of said springs and pivotally connecting said axles together.

3. In a motor vehicle, a frame, individual axles for opposite wheels of the vehicle, a pair of leaf springs extending transverse of said frame, said springs having large outer ends secured respectively to said axles and having upwardly extending small ends connected to said frame, and substantially parallel arms individually connecting said axles to said frame, said arms extending longitudinally of said frame and pivoted at their opposite ends respectively to said frame and to said axles.

4. In a motor vehicle, a frame, individual axles for opposite wheels of the vehicle, a support rigidly secured to and extending upwardly from said frame, a pair of leaf springs disposed above and supporting said frame, said springs being individually mounted on said axles, means to pivotally and individually connect said springs to said support, and means to hold said axles against horizontal movement relative to said frame.

5. In a motor vehicle, a frame, individual axles for opposite wheels of the vehicle, leaf springs individually connecting said axles to and solely supporting said frame, parallel arms individually connecting said axles to said frame, said arms being pivoted to said axles and to said frame and preventing horizontal movement of said axles relative to said frame, and substantially parallel upper and lower connecting bars pivotally connecting said axles together.

6. In a motor vehicle, a frame, individual axles for the front wheels of the vehicle, transverse leaf springs mounted on said axles and supporting said frame, said frame being suspended below said axles from inner ends of said springs, transverse substantially parallel bars pivotally connected adjacent their opposite ends to said axles, and longitudinal parallel arms pivotally connected adjacent their opposite ends to said frame and to said axles.

7. In a motor vehicle, a frame, individual axles for a pair of opposite wheels of the vehicle, a pair of transverse leaf springs mounted one on each of said axles and extending upwardly therefrom and supporting said frame, said frame being suspended below said axles from inner ends of said transverse springs, a pair of transverse bars disposed forwardly of said springs and having their opposite ends pivotally connected to said axles, a pair of parallel bars disposed rearward of said springs and having their opposite ends pivotally connected to said axles, a pair of vertically spaced parallel arms pivotally connected to said frame and to one of said axles for vertical movement about its pivots and holding said one axle against horizontal movement relative to said frame, and a pair of vertically spaced parallel arms pivotally connecting the other axle to said frame and preventing horizontal movement of said other axle relative to said frame.

8. In a motor vehicle, a frame including a pair of longitudinal frame members, a transverse support rigidly securing said frame members together, individual axles for opposite wheels of the vehicle, individual transverse springs having their outer ends connected to respective axles, means for pivotally and individually connecting the inner ends of said springs to said support, means to hold said axles against horizontal movement relative to said frame, and transverse substantially parallel bars pivotally connecting said axles together.

CHARLES F. MEGOW.